US011457008B2

(12) United States Patent
Bosch et al.

(10) Patent No.: US 11,457,008 B2
(45) Date of Patent: Sep. 27, 2022

(54) STEERING TRAFFIC ON A FLOW-BY-FLOW BASIS BY A SINGLE SIGN-ON SERVICE

(71) Applicant: Cisco Technology, Inc., San Jose, CA (US)

(72) Inventors: Hendrikus G. P. Bosch, Aalsmeer (NL); Alessandro Duminuco, Milan (IT); Julien Barbot, Villebon-sur-Yvette (FR); Jeffrey Michael Napper, Delft (NL); Sape Jurrien Mullender, Amsterdam (NL)

(73) Assignee: Cisco Technology, Inc., San Jose, CA (US)

( * ) Notice: Subject to any disclaimer, the term of this patent is extended or adjusted under 35 U.S.C. 154(b) by 88 days.

(21) Appl. No.: 17/069,540

(22) Filed: Oct. 13, 2020

(65) Prior Publication Data

US 2022/0116381 A1 Apr. 14, 2022

(51) Int. Cl.
*G06F 7/04* (2006.01)
*G06F 15/16* (2006.01)
*G06F 17/30* (2006.01)
*H04L 29/06* (2006.01)
*H04L 9/40* (2022.01)

(52) U.S. Cl.
CPC ........ *H04L 63/0815* (2013.01); *H04L 63/126* (2013.01); *H04L 63/18* (2013.01)

(58) Field of Classification Search
CPC ... H04L 63/0815; H04L 63/126; H04L 63/18; H04L 63/0807; H04L 63/105; H04L 63/0272
See application file for complete search history.

(56) References Cited

U.S. PATENT DOCUMENTS

| 8,776,209 B1 | 7/2014 | Kumar et al. |
| 2006/0123468 A1* | 6/2006 | Bird ................ G06F 16/20 726/4 |
| 2013/0276085 A1* | 10/2013 | Sharaga ........ H04N 21/25833 726/8 |
| 2014/0109175 A1 | 4/2014 | Barton et al. |
| 2014/0115684 A1 | 4/2014 | Hoggan |

(Continued)

OTHER PUBLICATIONS

The International Search Report and Written Opinion for PCT Application No. PCT/US21/54587, dated Jan. 20, 2022.

*Primary Examiner* — Amie C. Lin
(74) *Attorney, Agent, or Firm* — Lee & Hayes, P.C.

(57) ABSTRACT

Techniques for using a single sign-on (SSO) service as a software defined networking (SDN) controller for a virtual private network environment. The techniques disclosed herein may include receiving, at a first authentication service, first data including a first request to authenticate a user of a client device to access an application. The techniques may also include sending, to the client device, second data representing a second request configured to prompt a second authentication service to authenticate the user of the client device. Additionally, the first authentication service may receive an indication that the user was authenticated by the second authentication service and determine, based at least in part on an attribute associated with at least one of the client device or the application, whether the client device is to access the application using an unsecured connection or, alternatively, access the application using a secured connection.

20 Claims, 9 Drawing Sheets

(56) References Cited

U.S. PATENT DOCUMENTS

| | | |
|---|---|---|
| 2017/0346812 A1 | 11/2017 | Newell et al. |
| 2018/0005250 A1 | 1/2018 | Goldschlag et al. |
| 2019/0102534 A1* | 4/2019 | Elias ........................ G06F 21/41 |
| 2019/0149514 A1 | 5/2019 | Jawahar |
| 2019/0222568 A1 | 7/2019 | Sridhar et al. |
| 2019/0260733 A1* | 8/2019 | Koranda ............... H04L 67/146 |
| 2020/0145405 A1 | 5/2020 | Bosch et al. |

* cited by examiner

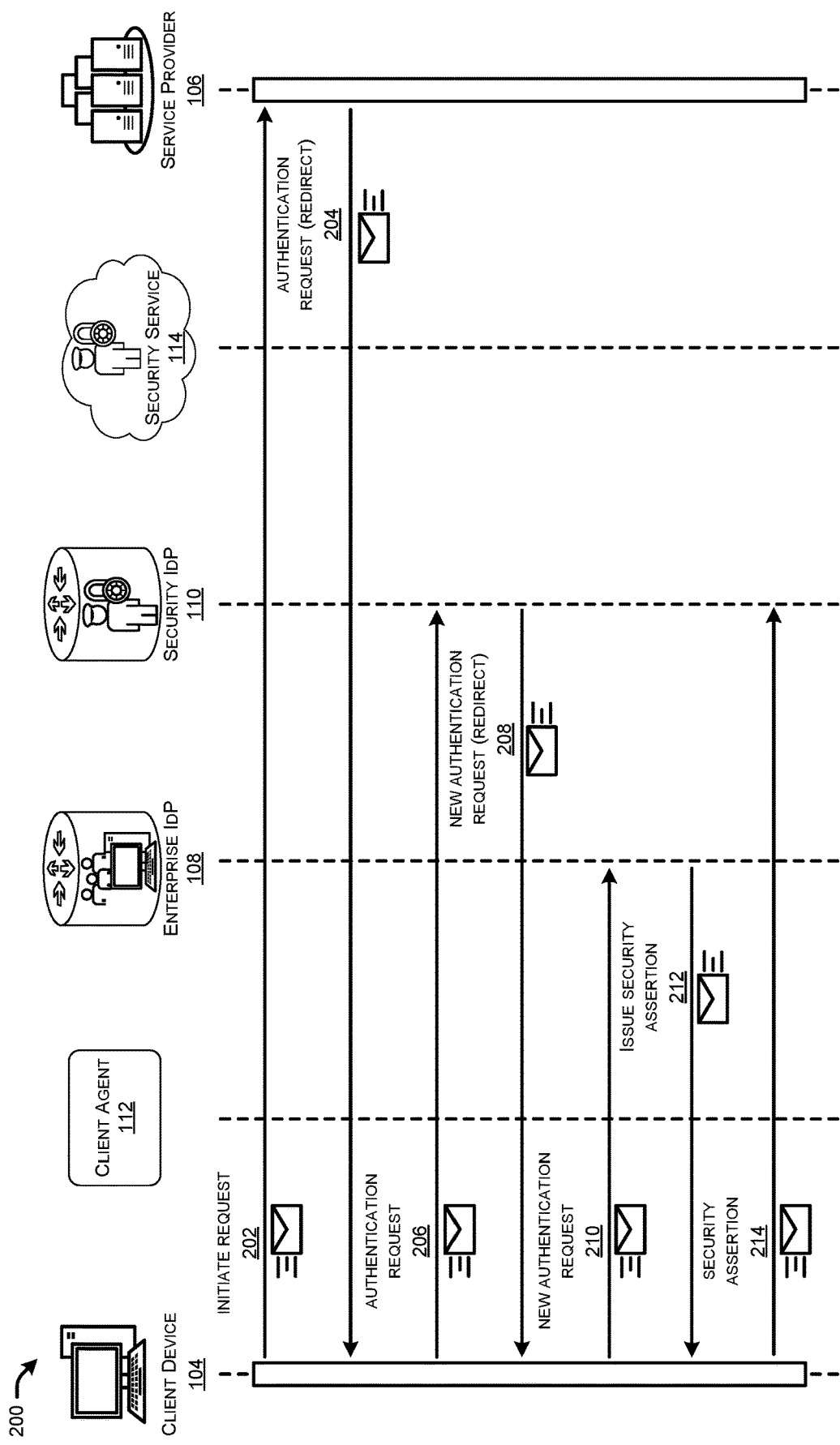

300

```
┌─────────────────────────────────────────────────────────────────┐
│ RECEIVE, AT A FIRST SINGLE SIGN-ON (SSO) SERVICE, FIRST DATA    │
│ INCLUDING A FIRST REQUEST TO AUTHENTICATE A USER OF A CLIENT    │
│ DEVICE TO ACCESS A SERVICE PROVIDER                             │
│                              302                                │
└─────────────────────────────────────────────────────────────────┘
                                 ↓
┌─────────────────────────────────────────────────────────────────┐
│ GENERATE SECOND DATA REPRESENTING A SECOND REQUEST CONFIGURED   │
│ TO PROMPT A SECOND SSO SERVICE TO AUTHENTICATE THE USER OF THE  │
│ CLIENT DEVICE                                                   │
│                              304                                │
└─────────────────────────────────────────────────────────────────┘
                                 ↓
┌─────────────────────────────────────────────────────────────────┐
│                SEND THE SECOND DATA TO THE CLIENT DEVICE        │
│                              306                                │
└─────────────────────────────────────────────────────────────────┘
                                 ↓
┌─────────────────────────────────────────────────────────────────┐
│ RECEIVE AN INDICATION FROM THE CLIENT DEVICE THAT AN IDENTITY   │
│ OF THE USER WAS AUTHENTICATED BY THE SECOND SSO SERVICE         │
│                              308                                │
└─────────────────────────────────────────────────────────────────┘
                                 ↓
┌─────────────────────────────────────────────────────────────────┐
│ DETERMINE, BASED AT LEAST IN PART ON THE IDENTITY OF THE USER,  │
│ WHETHER THE CLIENT DEVICE IS TO (I) ACCESS THE SERVICE PROVIDER │
│ USING AN UNSECURED CONNECTION OR (II) ACCESS THE SERVICE        │
│ PROVIDER USING A SECURED CONNECTION                             │
│                              310                                │
└─────────────────────────────────────────────────────────────────┘
```

FIG. 3

STEERING TRAFFIC ON A FLOW-BY-FLOW BASIS BY A SINGLE SIGN-ON SERVICE

TECHNICAL FIELD

The present disclosure relates generally to using a single sign-on (SSO) service as a software defined networking (SDN) controller for steering traffic on a flow-by-flow basis in a network environment.

BACKGROUND

Today, using virtual private networks (VPNs) on enterprise devices can be clunky, cumbersome, and error prone. For instance, all VPN traffic originating at an enterprise device is generally tunneled over some form of an IP-in-IP tunnel indiscriminately. Additionally, implementing VPNs on a per-application basis only considers the source application and requires Mobile Device Management (MDM) to participate. Further, split-tunnel routing procedures are often not allowed by enterprises that consider split-tunnel routing a security risk, and thereby render local devices, such as printers, or Wi-Fi splash pages unreachable. As another example, configuration issues and uptime of head-ends often frustrate the use of VPN services, and if split-tunnel routing is enabled on VPN clients, such routing is more or less static—VPN flow dispositions are established statically, or, at best, the VPN client is sent a flow disposition periodically.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A, 2B, and 2C collectively illustrate a data flow diagram of an example process according to which an identity provider (IdP) SSO service determines whether a client device may access a service provider using a connection that is secured or unsecured.

FIG. 3 illustrates a flow diagram of an example method for using an SSO service to determine whether a client device may access a service provider using a connection that is secured or unsecured.

DESCRIPTION OF EXAMPLE EMBODIMENTS

Overview

Figure 1A:
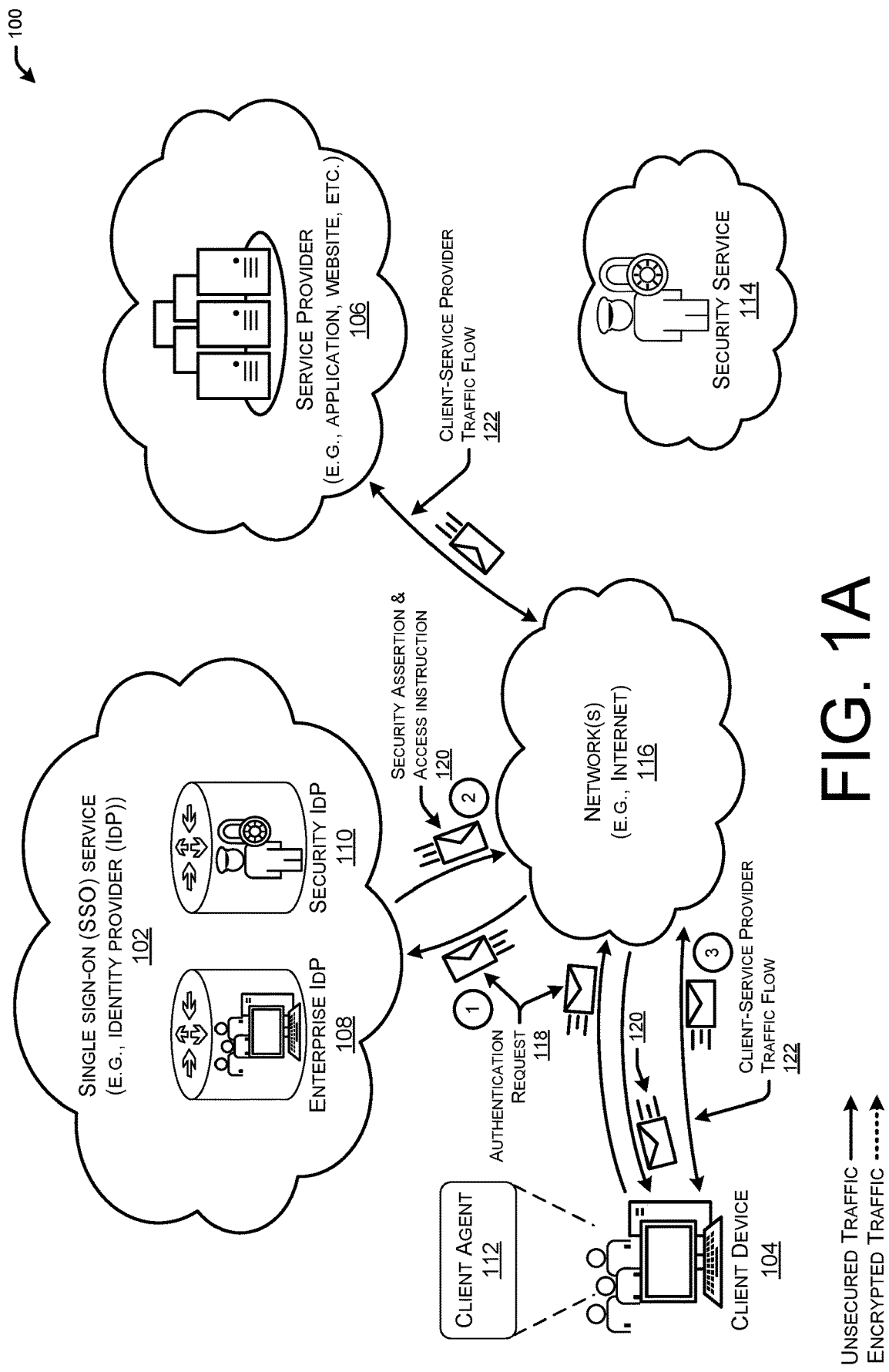
FIGS. 1A and 1B collectively illustrate a system-architecture diagram of an example environment for implementing at least some of the various technologies disclosed herein. The environment includes a single sign-on (SSO) service that determines how client devices should connect to various service providers.

This disclosure describes various technologies for using a single sign-on (SSO) service as a software defined networking (SDN) controller to determine whether client devices need to connect to remote service providers using a connection that is secured or unsecured. Some of the techniques described in this disclosure may include receiving, at a first SSO service and from a client device, first data including a first request to authenticate a user of the client device to access a service provider. In response, the first SSO service may generate second data representing a second request configured to prompt a second SSO service to authenticate the user of the client device, and then send the second data to the client device. The techniques may also include receiving an indication from the client device that an identity of the user was authenticated by the second SSO service. In this way, based at least in part on the identity of the user, the first SSO service may determine whether the client device is to (i) access the service provider using an unsecured connection or (ii) access the service provider using a secured connection. Traditionally, determining how enterprise, client devices were to access service providers (e.g., using a secured or unsecured connection) was performed on a per device basis, on a per-application basis (using MDM, for instance), or on a destination domain basis. However, by performing these operations at an SSO service that is remote to the enterprise network, various improvements in computer related technology are achieved such as: combined authentication and authorization for cloud-based server applications and IP-in-IP tunnels from end devices; eliminating the need to install client certificates on end devices with techniques such as Mobile Device Management (MDM); eliminating the need to provision per-application virtual private networks (VPNs) with techniques such as MDM.

The techniques described in this disclosure may be performed as a method and/or by a system having non-transitory computer-readable media storing computer-executable instructions that, when executed by one or more processors, performs the techniques described above.

Example Embodiments

As discussed above, using virtual private networks (VPNs) on enterprise devices can be clunky, cumbersome, and error prone. For instance, all VPN traffic originating at an enterprise device is generally tunneled over some form of an IP-in-IP tunnel indiscriminately. Additionally, per-application VPN-ing only considers the source application and requires Mobile Device Management (MDM) to participate. Further, split-tunnel routing procedures are often not allowed by enterprises that consider split-tunnel routing a security risk, and thereby render local devices, such as printers, or Wi-Fi splash pages unreachable. As another example, configuration issues and uptime of head-ends often frustrate the use of VPN services, and if split-tunnel routing is enabled on VPN clients, such routing is more or less static—VPN flow dispositions are established statically, or, at best, the VPN client is sent a flow disposition periodically.

Accordingly, described herein are improvements in technologies that, among other things, allow for an SSO service, such as an identity provider (IdP) service or an OpenID Connect service, to select flow dispositions dynamically. In various examples, the SSO service may make a determination of how a flow is delivered to a cloud-based service based on one or more of: its destination application; a posture of a device (e.g., whether the device is properly maintained), user (e.g., whether the enterprise user is a regular or partner employee), and/or network (e.g., whether flows are sent over private SD-WAN or open Internet networks); and/or a threat matrix of client and cloud applications (e.g., whether the applications have previously been hacked into), users (e.g., whether the user is a suspect user), and/or enterprises (e.g., whether there is a known attack presently ongoing). The SSO service may be capable of deciding whether flows are allowed to be routed across the Internet to a cloud-based service, or if flows need to be captured by way of an IP-in-IP tunnel and delivered to a cloud service by way of a software defined wide area network (SD-WAN), private network (e.g., VPN), and/or a security cloud. As such, these features may enable an enterprise to mix zero trust network access (ZTNA) and traditional VPN networking, as well as enable easy use of guest Wi-Fi networks, home printers, etc., while still being able to capture selected traffic.

Traditionally, in Security Assertion Markup Language (SAML) based authentication, the IdP of an SSO service may be called upon for web-transactions configured to use the IdP for authentication and authorization on a web-based service provider (e.g., web-based application). The IdP may assert the identity of an enterprise user and provide a statement to this effect, and then send the statement to the service provider by way of the enterprise user's web-browser. However, in at least one example of the various technologies disclosed herein, an enterprise IdP may be extended with a separate IdP configured as an SDN controller, and the separate IdP may field web-server requests for the enterprise, reach out to existing enterprise IdPs, combine enterprise user information with information stored by the web-based service provider, including its usage, device, and/or network posture, and create a traffic flow disposition that is specific for the web-call at issue. This traffic flow disposition may, in some examples, either enable direct access to the web-based service provider across the Internet, or tunnel data from the client device in an IP-in-IP tunnel to an SD-WAN, private network, and/or security cloud. Additionally, in some examples the lifetime of SAML statements and associated cookies may be limited, thus creating a dynamic and supervised method for flow routing.

By way of example and not limitation, a method according to the various technologies described herein may include receiving, at a first SSO service and from a client device, first data including a first request to authenticate a user of the client device to access a service provider (e.g., web-based application). The first request may comprise a first SAML request for a SAML statement identifying the user of the client device. In some examples, the service provider may have redirected the client device to send the request to the first SSO service for authentication before granting the client device access to the service provider's service. The first SSO service may comprise a first IdP service that is, among other things, configured to determine whether traffic flows between client devices and service providers are to be established using secured connections (e.g., VPN, SD-WAN, security cloud, etc.) or unsecured connections (e.g., direct to service provider via the internet).

The method may also include, in some examples, generating, at the first SSO service, second data representing a second request configured to prompt a second SSO service to authenticate the user of the client device, and sending the second data to the client device. The second request may comprise a second SAML request for a SAML statement identifying the user of the client device. In some examples, the first SSO service may send the second data directly to the second SSO service. Additionally, or alternatively, the first SSO service may send the second data to the client device and direct the client device to obtain a SAML statement from the second SSO service. The second SSO service may comprise a second IdP service that is configured to at least one of authenticate or authorize users of various client devices.

The method may further include receiving an indication from the client device that an identity of the user was authenticated by the second SSO service. In some examples, receiving the indication may include receiving a security assertion (e.g., SAML statement) from the client device that indicates the identity of the user. Additionally, or alternatively, the security assertion may be sent by reference to the first SSO service from the second SSO service and/or the client device. In such instances, the method may include obtaining the security assertion (e.g., SAML statement) from the second SSO service based at least in part on receiving the indication. In some examples, the indication and/or the security assertion may contain additional data that is used by the first SSO service to determine how to dispose of a traffic flow between the client device and the service provider. For instance, additional detail may include an identity of the service provider; a posture of the client device (e.g., whether the device is properly maintained), user (e.g., whether the enterprise user is a regular or partner employee), and/or network (e.g., whether flows are sent over private SD-WAN or open Internet networks); and/or a threat matrix of client and cloud applications (e.g., whether the applications have previously been hacked into), users (e.g., whether the user is a suspect user), and/or enterprises (e.g., whether there is a known attack presently ongoing).

In some examples, based at least in part on the identity of the user, the first SSO service may determine whether the client device is to access the service provider using an unsecured connection or, instead, access the service provider using a secured connection. As used herein, accessing the service provider using an unsecured connection may include accessing the service provider directly over the internet via a web browser running on the client device. Additionally, accessing the service provider using the secured connection may comprise accessing the service provider using a VPN connection, an SD-WAN connection, via a security cloud, or another secured/tunneled connection. In some examples, determining whether the client device is to access the service provider using the secured connection or the unsecured connection may be further based at least in part on other attributes associated with the user and/or the service provider, such as: an identity of the service provider; a posture of the client device, user, and/or network; and/or a threat matrix of client and cloud applications, users, and/or enterprises.

In at least one example, the first SSO service may determine that the client device is to access the service provider using an unsecured connection. When the client device is to use an unsecured connection, the first SSO service may generate third data including a security assertion (e.g., SAML statement) that is to be sent to the service provider to authenticate the identity of the user. The third data may also include an instruction that the client device access the service provider using the unsecured connection. The first SSO service may, in various examples, send the third data to the client device such that the client device may present the security assertion to the service provider when establishing a connection.

In contrast, in at least one other example, the first SSO service may determine that the client device is to access the service provider using a secured connection. When the client device is to use a secured connection, the first SSO service may generate fourth data that includes a first security assertion for the service provider and a second security assertion for an agent (e.g., web browser, VPN client, etc.) of the client device. The fourth data may also include an instruction that the client device access the service provider using the secured connection. The first SSO service may send the fourth data to the client device or the agent of the client device in order to facilitate establishment of the secured connection. The secured connection may comprise, for example, an encrypted traffic flow between at least one of the client or client agent and a cloud-based security service.

Although several of the examples described in this disclosure are made with respect to SAML based SSO services, including IdP, it is contemplated that the technologies of this disclosure are equally applicable to other forms of SSO services, such as OAuth 2.0-based OpenID Connect, as well as other forms of authentication and/or authorization services. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
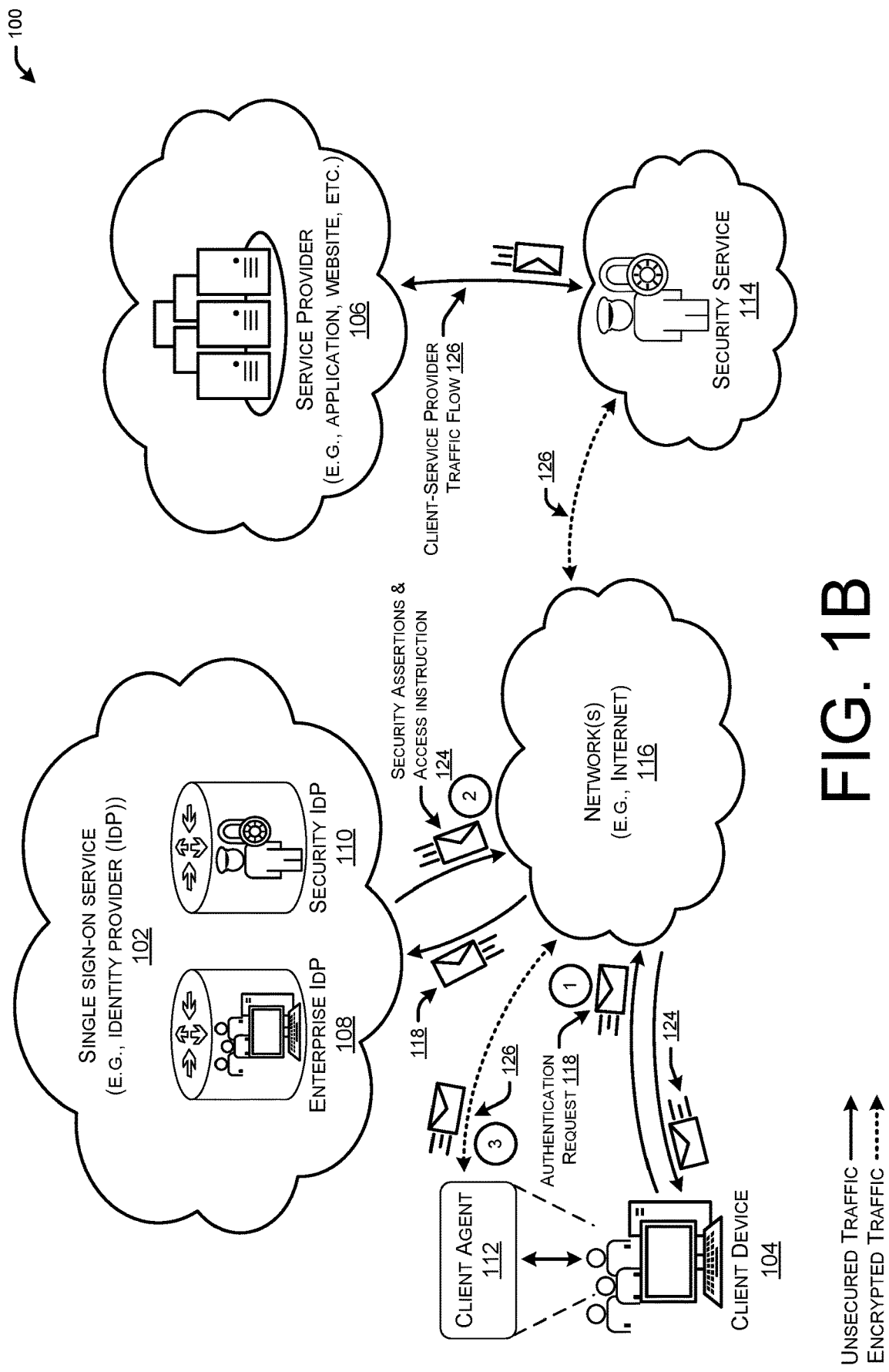

FIGS. 1A and 1B collectively illustrate a system-architecture diagram of an example environment 100 for implementing at least some of the various technologies disclosed herein. The environment 100 includes a single sign-on (SSO) service 102 that determines how client devices, such as client device 104, should connect to various service providers, such as service provider 106. Additionally, FIG. 1A illustrates an example traffic flow associated with the SSO service 102 determining that the client device 104 should access the service provider 106 using an unsecured connection, while FIG. 1B illustrates an example traffic flow associated with the SSO service 102 determining that the client device 104 should access the service provider 106 using a secured (e.g., encrypted) connection.

The SSO service 102 may include one or more configurations. For instance, the SSO service 102 may comprise a SAML or XML-based SSO service, a kerberos-based SSO service, a smart-card-based SSO service, and/or an Integrated Windows Authentication based SSO service. The SSO service 102 may additionally or alternatively comprise an OAuth 2.0 based SSO service that, for instance, utilizes OpenID Connect for its identity layer to provide user authentication and/or authorization.

As shown, the SSO service 102 may be extended to include two IdPs, such as an enterprise IdP 108 and a security IdP 110. Although the enterprise IdP 108 and the security IdP 110 are depicted as IdP services for illustration purposes, it should be understood that these services may instead comprise authentication servers that are configured to operate using an OAuth 2.0 based protocol or another authentication standard. In some examples, the security IdP 110 may be configured as an SDN controller in that the security IdP 110 may field web-server requests for an enterprise, reach out to enterprise IdP 108, combine enterprise user information with information from the service provider 106, its usage, device and/or network posture, and create a disposition policy tailored to specific web-calls. Additionally, the security IdP 110 may be configured to authorize service providers, such as service provider 106, while the enterprise IdP 108 may be configured to authenticate users of client device 104.

The client device 104 may comprise any type of device configured to communicate using various communication protocols (e.g., VPN, SSL, TLS, DTLS, and/or any other protocol) over the networks 116. For instance, the client device 104 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device. The client device 104 may host a client agent 112. The client agent 112 may comprise a VPN client, TLS client, web browser, or another application configured to enable communications over the networks 116. In some examples, the client agent 112 may be capable of hosting a web-proxy service and/or capable of setting up a DTLS/TLS VPN tunnel to a cloud-based head-end that, in some examples, may be co-located with a cloud-based security service 114.

The example service provider 106 may provide one or more services to various client devices via the networks 116. The service provider 106 may include, in some examples, an application service, a website, or another cloud-based service. In some examples, the service provider 106 may provide basic resources such as processor (CPU), memory (RAM), storage (disk), and networking (bandwidth) to the client device 104. Additionally, in some examples, the service provider 106 may provide, host, or otherwise support one or more application services for the client devices 104 to connect to and use. In some instances, computing resources associated with and/or allocated to the service provider 106 may be stored in various data centers located at different physical locations. For instance, first computing resources of the service provider 106 may be stored in a first data center located in a first geographic location while second computing resources of the service provider 106 may be stored in a second data center located in a second geographic location. The data centers may be physical facilities or buildings located across geographic areas that are designated to store networked devices. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs.

The environment 100 may, in some examples, include one or more security services, such as security service 114. The security service 114 may comprise a cloud-based security service for in-line security services. In some examples, the security service 114 may inspect HTTP sessions, provide for traffic flow telemetry, and/or detect malware depending on its configuration. In some examples, the security IdP 110 may be hosted jointly with the cloud-based security service 114. In other examples, as that shown in exemplary FIGS. 1A and 1B, the security IdP 110 may comprise a separately hosted entity from the cloud-based security service 114.

The SSO service 102, including enterprise IdP 108 and security IdP 110, as well as the client device 104, service provider 106, client agent 112, and security service 114 may communicate with one another via one or more networks 116, such as the internet. The networks 116 may include one or more networks implemented by any viable communication technology, such as wired and/or wireless modalities and/or technologies. The networks 116 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

As noted above, FIG. 1A illustrates an example traffic flow associated with the SSO service 102 determining that the client device 104 should access the service provider 106 using an unsecured connection. At step "1" with respect to FIG. 1A, the client device 104 sends an authentication request 118 to the SSO service 102. In some examples, the authentication request 118 is sent to the security IdP 110. The authentication request 118 may comprise a SAML request for the SSO service 102 and/or the security IdP 110 to provide a security assertion (e.g., SAML statement). In some examples, the authentication request 118 may have been initiated by the service provider 106 in response to receiving a connection request from the client device 104, and the service provider 106 may have redirected the client device 104 to the SSO service 102 for authentication.

In some examples, after receiving the authentication request 118, the security IdP 110 may generate a new authentication request and redirect the client device 104 to send the new authentication request to the enterprise IdP 108 so that the enterprise IdP 108 may authenticate a user of the client device 104. In this way, the enterprise IdP 108 may authenticate the user and/or provide a security assertion associated with the client device 104 and/or a user of the client device 104 in order for the client device 104 to be granted access to the service provider 106. The enterprise IdP 108 may then provide the security assertion to the security IdP 110, and the security IdP 110 may determine, based at least in part on one or more attributes (e.g., identity of the user, posture of device, network, and/or service provider, etc.) included in the security assertion, whether the client device 104 is to access the service provider 106 using a secured connection or an unsecured connection.

At step "2" with respect to FIG. 1A, the SSO service 102 determines that the client device 104 is to use an unsecured connection to access the service provider 106, and accordingly sends data containing a security assertion and access instructions 120 to the client device 104 via the networks 116. The security assertion and access instruction 120 may be used by the client device 104 to determine how to access the service provider 106, as well as to authenticate the user of the client device 104 to the service provider 106 in order to be granted access. For instance, when establishing the client-service provider traffic flow 122, the client device 104 may provide the service provider 106 with the security assertion.

At step "3" with respect to FIG. 1A, the client device 104 and the service provider 106 establish the client-service provider traffic flow 122. As shown, this traffic flow comprises a direct, unsecured traffic flow between the client device 104 and the service provider 106 via the networks 116 (e.g., the internet).

With respect to FIG. 1B, further illustrated is an example traffic flow associated with the SSO service 102 determining that the client device 104 should access the service provider 106 using a secured (e.g., encrypted) connection. At step "1" with respect to FIG. 1B, the client device 104 sends an authentication request 118 to the SSO service 102. In some examples, the authentication request 118 is sent to the security IdP 110. The authentication request 118 may comprise a SAML request for the SSO service 102 and/or the security IdP 110 to provide a security assertion (e.g., SAML statement). In some examples, the authentication request 118 may have been initiated by the service provider 106 in response to receiving a connection request from the client device 104, and the service provider 106 may have redirected the client device 104 to the SSO service 102 for authentication.

In some examples, after receiving the authentication request 118, the security IdP 110 may generate a new authentication request and redirect the client device 104 to send the new authentication request to the enterprise IdP 108 so that the enterprise IdP 108 may authenticate a user of the client device 104. In this way, the enterprise IdP 108 may authenticate the user and/or provide a security assertion associated with the client device 104 and/or a user of the client device 104 in order for the client device 104 to be granted access to the service provider 106. The enterprise IdP 108 may then provide the security assertion to the security IdP 110, and the security IdP 110 may determine, based at least in part on one or more attributes (e.g., identity of the user, posture of device, network, and/or service provider, etc.) included in the security assertion, whether the client device 104 is to access the service provider 106 using a secured connection or an unsecured connection.

At step "2" with respect to FIG. 1B, the SSO service 102 determines that the client device 104 is to use a secured connection to access the service provider 106, and accordingly sends data 124 containing one or more security assertions and access instructions to the client device 104 via the networks 116. The one or more security assertions included in the data 124 may include a first security assertion that is for the service provider 106 and a second security assertion that is for the client agent 112.

With respect to the second security assertion (e.g., SAML statement) included in the data 124, the second security assertion may include a series of parameters (e.g., access instructions) directing the client agent 112 to capture the client device's flow. The second security assertion may additionally contain a set of fully qualified domain names (FQDNs) for flows that need to be captured and tunneled to a cloud-based head-end and/or the security service 114. Tunneling of these flows may, in some examples, be based on IP-in-DTLS/TLS tunneling; however, it is contemplated that other tunneling methods may be used. Additionally, or alternatively, the second security assertion may include a public key that is associated with the service provider 106 in case encrypted server name indication (ESNI) is used, and a lifetime indicating a threshold amount of time that the security assertion(s) are valid for the client device 104 to access the service provider 106.

In some examples, for the security IdP 110 to reach the client agent 112 by way of the client device 104 (e.g., by way of an application executing on the client device, such as a web browser), the security IdP 110 may redirect the call to "localhost" carrying the data 124. The client agent 112 may listen for incoming web-requests on various ports, for example, ports 80 and 443, such that messages similar to data 124 find their way to the client agent 112. In some examples, the security IdP 110 may decide to transmit the first security assertion and the second security assertion by reference, and it may be necessary for the client agent 112 to obtain both security assertions directly from the security IdP 110.

At step "3" with respect to FIG. 1B, the client device 104, the client agent 112, the security service 114, and the service provider 106 establish the encrypted client-service provider traffic flow 126. As shown, this traffic flow comprises a secured traffic flow in which data is tunneled between at least the client agent 112 and the security service 114 while the client device 104 is accessing the service provider 106.

To establish the client-service provider traffic flow 126, in some examples, once the client agent 112 holds both security assertions, it may first program a DNS cache with new entries for the FQDNs indicated by the second security assertion, addressing the local client agent 112. This means that when the client device 104 is redirected to the service provider 106, the name resolves to, for example, localhost, and arrives in the client agent 112. In some instances, the reason for updating the DNS cache is because when the client device 104 is using a web browser, the browser may show a URL corresponding with the service provider 106 instead of the localhost. Additionally, the server name indicator (SNI) of an outgoing TLS session for the service provider 106 should list the URL corresponding with the service provider 106 or else final HTTP flows may not be stitched together in the client agent 112.

In some examples, carrying a lifetime in the second security assertion may be important to instruct the client agent 112 when to forward and stop forwarding flows to the service provider 106 across the IP-in-DTLS/TLS tunnel between the client agent 112 and the security service 114. This lifetime may, in some examples, be directly associated with the lifetime of at least one of the first security assertion or the second security assertion, and when the lifetime of at least one of the first security assertion or the second security assertion expires, the client agent 112 may not receive further web-traffic from the client device 104. When the lifetime expires, the DNS cache entry for the service provider 106 may need to be cleared to enable the client device 104 to resolve new flows directly to the service provider 106 again.

It is contemplated that if and when ESNI is supported, DNS may be used to share a public key with the client device 104 to enable it to cipher ESNI for the service provider 106 with that key. In various examples, the associated private key may be held by the client agent 112 and distributed from the security IdP 110 in the second security assertion (i.e., the security assertion associated with the client agent 112).

By including the first security assertion from the security IdP 110 in the data 124, the user may be authenticated and authorized on the service provider 106. This first security assertion is carried in various messages in an initial session with the service provider 106. Thus, when the client device 104 receives the final redirect message of the data 124, the client device 104 sets up anew session with the service provider 106 and resolves the URL associated with the service provider 106 to localhost. Additionally, the client device 104 may connect a TCP session to the client-agent 112.

In some examples, the client agent 112 may be used to tunnel web-sessions in a DTLS/TLS tunnel to the security service 114. When the client device 104 establishes its TCP session meant for the service provider 106, on receipt of a TLS Client-Hello message, the client agent 112 combines the ESNI with the second security assertion and/or the access instruction it received in the data 124 from the security IdP 110, and establishes the IP-in-DTLS/TLS tunnel of the client-service provider traffic flow 126 with the security service 114. The second security assertion carries both the authentication for the client agent 112 and the authorization for using the service provider 106. Once the DTLS/TLS tunnel has been established, the client agent 112 may set up a TCP session with the service provider 106, and simply forwards TLS records between the two TCP sessions. In some instances, if and when the security service 114 wishes to intercept and open up the web-session, it may do so when it receives the TLS records.

Figure 2B:
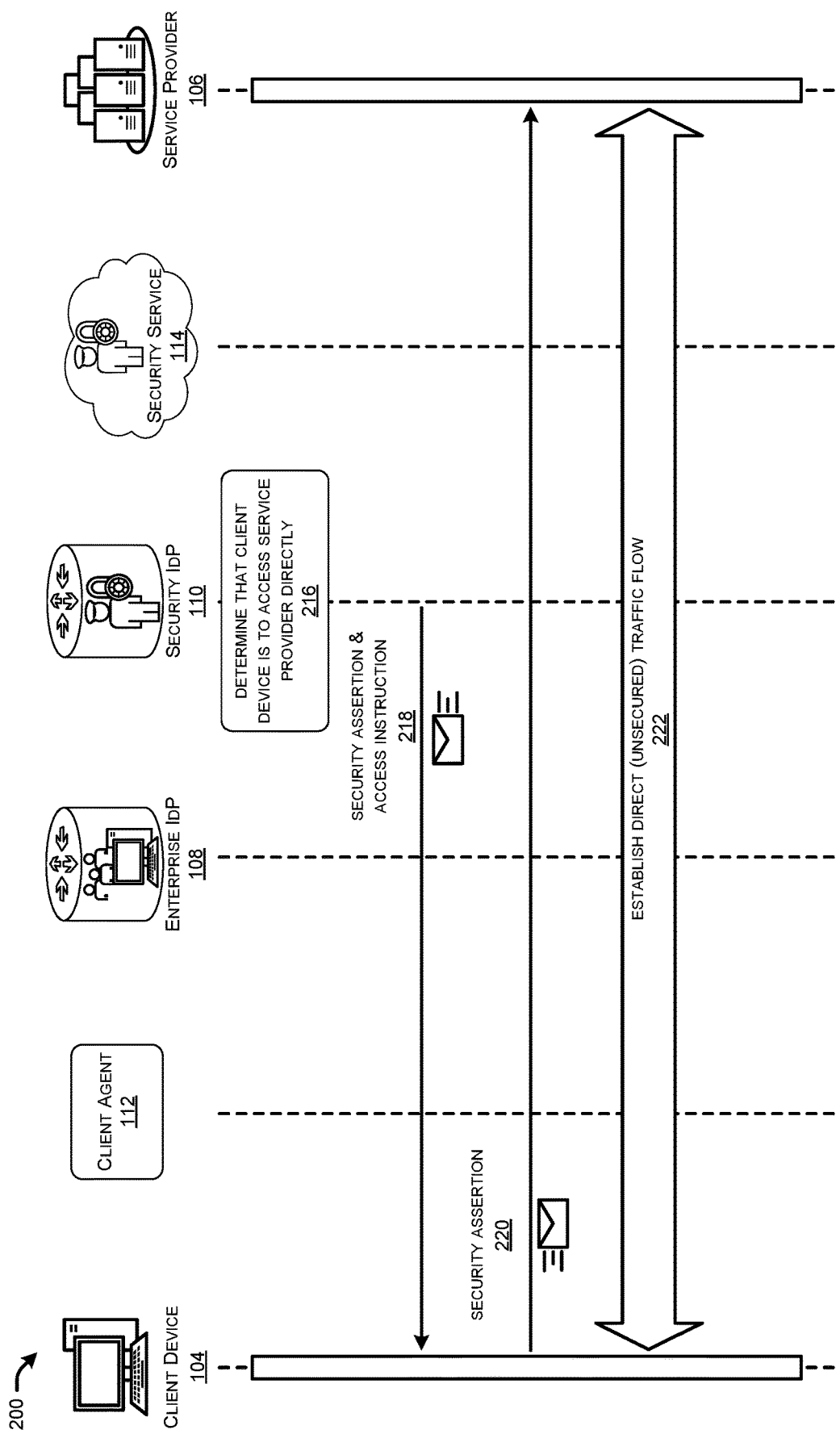
Figure 2C:
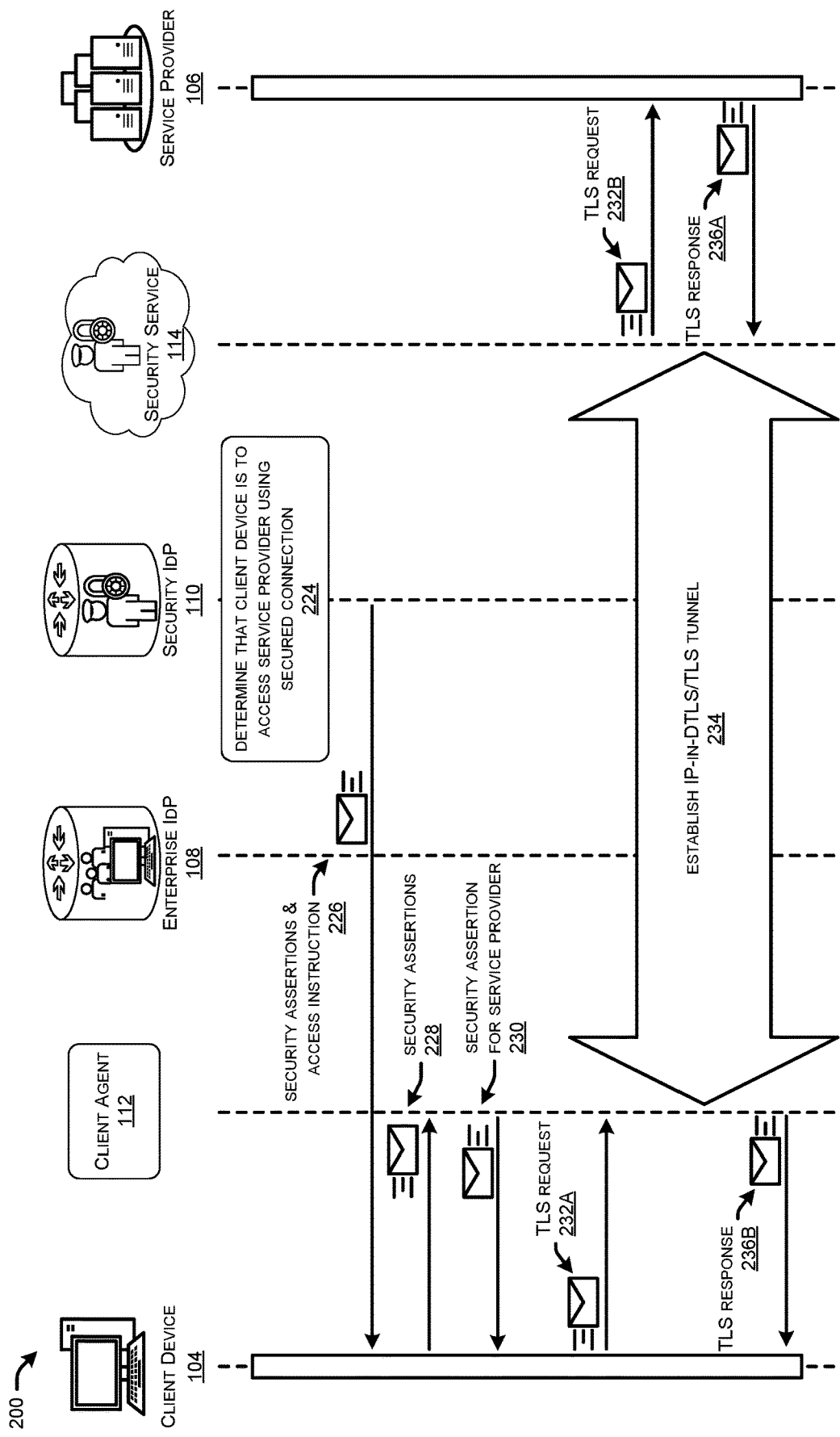

FIGS. 2A, 2B, and 2C collectively illustrate a data flow diagram of an example process 200 according to which an identity provider (IdP) SSO service (e.g., SSO service 102) determines whether a client device 104 may access a service provider 106 using a connection that is secured or unsecured. The process 200 may include various devices/actors that perform one or more tasks of the process 200, including the client device 104, the service provider 106, the enterprise IdP 108, the security IdP 110, the client agent 112, and the security service 114.

The process 200 begins with the client device 104 sending an initial connection request message 202 to the service provider 106. In some examples, the client device 104 may resolve a URL name corresponding with the service provider 106 through the client device's DNS services, and then initiate a communication session (e.g., HTTP session, TLS session, TCP session, etc.) to the service provider 106 with message 202. At this stage, the client device 104 may not maintain a security assertion (e.g., SAML statement) of its user and/or may not host a cookie for the service provider 106 pointing at that non-existent security assertion.

In examples, the service provider 106, on receiving the connection request message 202, may find that the message 202 lacks a security assertion or cookie and, in response, generate an authentication request message 204 (e.g., SAML request) and redirect the client device 104 with message 204 to the SSO service which is implemented by the security IdP 110. In some examples, the SSO service may be configured by an enterprise at the service provider 106. The client device 104 may follow the redirects and send the authentication request to the SSO service security IdP 110 with message 206.

The security IdP 110, on receipt of the authentication request for the service provider 106 through message 206, stashes the request and formulates a new authentication request for the enterprise IdP 108 to learn of the identity of the user of the client device 104. This new authentication request is sent through messages 208 and 210 to the enterprise IdP 108. In some examples, the enterprise IdP 108 may have been pre-configured to accept authentication requests from the security IdP 110 on behalf of the service provider 106. In some examples, the enterprise IdP 108 may be used to authenticate the user while the security IdP 110 may authorize the service provider 106. Once the user of the client device 104 authenticates to the enterprise IdP 110, the enterprise IdP 110 sends message 212 containing a security assertion to the client device 104, which then relays the security assertion to the security IdP 110 through message 214.

With respect to FIGS. 2B and 2C, once the security IdP 110 has received message 214 containing the security assertion from the enterprise IdP 108 reflecting the user's identity, the security IdP 110 may decide how to dispose of the flow. In FIGS. 2B and 2C, the security IdP 110 uses the user's identity to make this decision, but it should be understood that the security IdP 110 may use multiple sources to determine how to dispose of a flow. For instance, the security IdP 110 may use the device, network, or user posture to make this decision, as well as other attributes and/or sources described in this disclosure.

At 216, the security IdP 110 determines that the client device 104 is to access the service provider 106 directly and, in response, the security IdP generates a new security assertion to be provided to the service provider 106. The security assertion may assert the identity of the user. The security assertion may be sent to the service provider 106 via messages 218 and 220. Additionally, messages 218 and 220 may include additional data instructing the client device 104 to consume the service provider 106 directly (e.g., using an unsecured connection over the internet). At 222, the direct traffic flow between the client device 104 and the service provider 106 is established such that data may flow between the client device 104 and the service provider 106.

Alternatively, at 224, the security IdP 110 determines that the client device 104 is to access the service provider 106 using a secured connection. In response, the security IdP 110 may generate a first security assertion akin to the security assertion mentioned above that is used for direct communication with the service provider 106 but, in addition, also generate a second security assertion that includes a series of parameters directing the client agent 112 to capture the client device 104 flow. The second security assertion may contain a set of FQDNs for flows that need to be captured and tunneled to the security services 114. Tunneling of these flows may be based on IP-in-DTLS/TLS tunneling, but it is contemplated that other tunneling methods equally apply. Additionally, or alternatively, the second security assertion may carry a public key for the service provider 106 and/or a lifetime of the security assertion for the service provider 106. Both security assertions, the first and the second, may be sent with messages 226 and 228 to the client agent 112.

Once the client agent 112 receives message 228, the client agent 112 may program a DNS cache with new entries for the FQDNs indicated by the second security assertion. By including the first security assertion from the security IdP 110 in message 228, the user may be authenticated and authorized on the service provider 106. This first security assertion is carried in messages 232A and 232B in an initial session with the service provider 106. Additionally, the client device 104 may connect a TCP session to the client-agent 112.

In some examples, the client agent 112 and/or the security service 114 may establish an IP-in-DTLS/TLS tunnel 234 that is used to tunnel web-sessions between the client agent 112 and the security service 114. For instance, when the client device 104 establishes its TCP session meant for the service provider 106, on receipt of a TLS Client-Hello message, the client agent 112 combines the ESNI with the second security assertion and/or the access instruction it received from the security IdP 110, and establishes the IP-in-DTLS/TLS tunnel 234 of the client-service provider traffic flow with the security service 114. The second security assertion carries both the authentication for the client agent 112 and the authorization for using the service provider 106. Once the IP-in-DTLS/TLS tunnel 234 has been established, the client agent 112 may set up a TCP session with the service provider 106, and simply forward TLS records between the two TCP sessions. In some instances, if and when the security service 114 wishes to intercept and open up the web-session, it may do so when it receives the TLS records. In this way, data including the example TLS response message 236A and 236B may be communicated between the service provider 106 and the client device 104 via the IP-in-DTLS/TLS tunnel 234.

Figure 4:
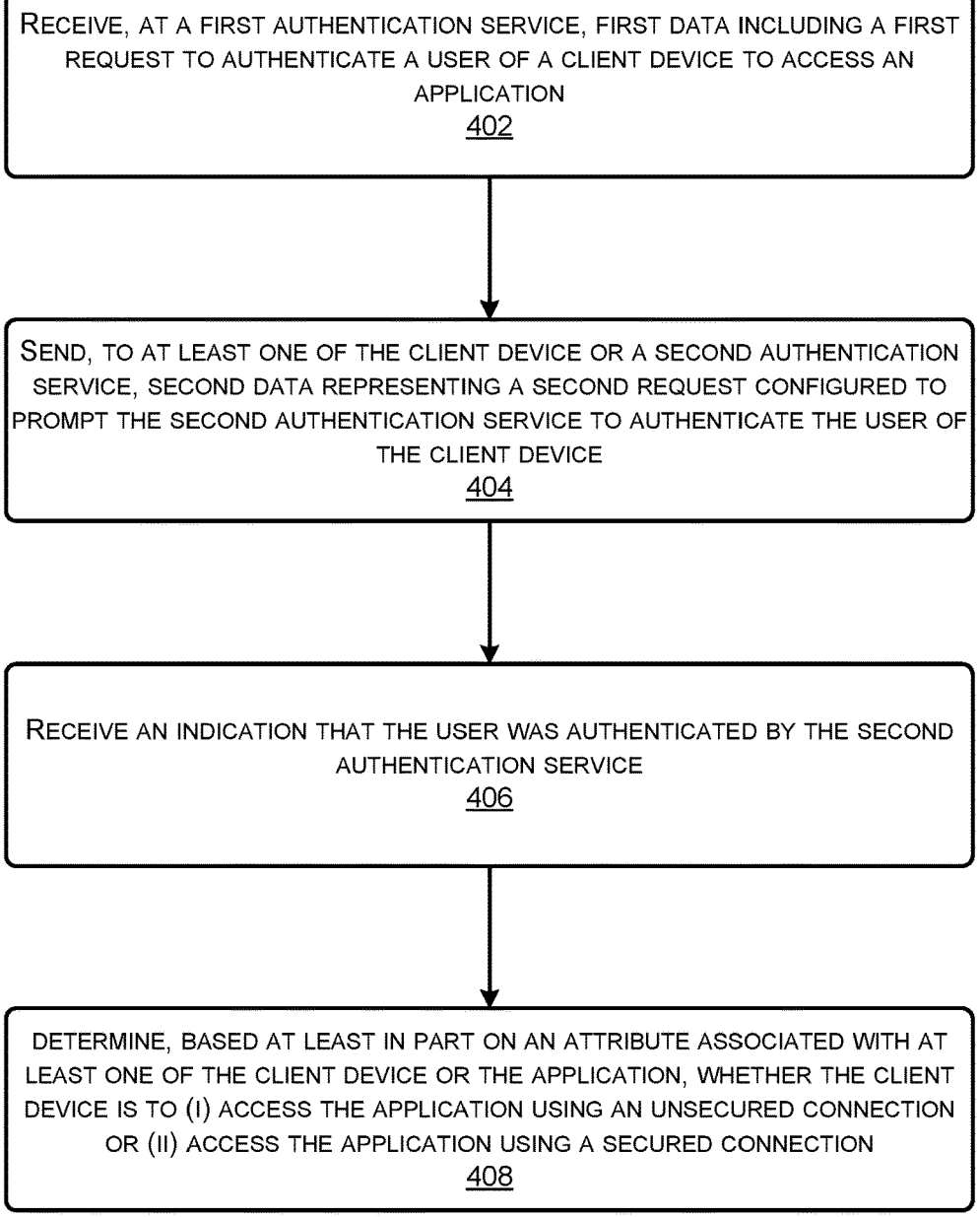
FIG. 4 illustrates a flow diagram of another example method for using an authentication service to determine whether a client device may access an application using a connection that is secured or unsecured.

FIGS. 3 and 4 illustrate flow diagrams of example methods 300 and 400 that illustrate aspects of the functions performed at least partly by the SSO service 102 and/or the security IdP 110 as described in FIGS. 1A-2C. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3, 4, and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for using an SSO service to determine whether a client device may access a service provider using a connection that is secured or unsecured. The method 300 begins at 302, during which first data is received at a first SSO service and from a client device, the first data including a first request to authenticate a user of the client device to access a service provider. In various examples, the first request may comprise a first SAML request for a SAML statement identifying the user of the client device. The service provider may have redirected the client device to send the request to the first SSO service for authentication before granting the client device access to the service provider's service. The first SSO service may comprise a first IdP service or a first OpenID Connect service that is, among other things, configured to determine whether traffic flows between client devices and service providers are to be established using secured connections (e.g., VPN, SD-WAN, security cloud, etc.) or unsecured connections (e.g., direct to service provider via the internet).

At 304, the method 300 includes generating, at the first SSO service, second data representing a second request configured to prompt a second SSO service to authenticate the user of the client device, and at 306, the method 300 includes sending the second data to the client device. The second request may comprise a second SAML request for a security assertion (e.g., SAML statement) identifying the user of the client device. In some examples, the first SSO service may send the second data directly to the second SSO service. Additionally, or alternatively, the first SSO service may send the second data to the client device and direct the client device to obtain a SAML statement from the second SSO service. The second SSO service may comprise a second IdP service or a second OpenID Connect service. The second SSO service may be configured to at least one of authenticate or authorize users of various client devices.

At 308, the method 300 includes receiving an indication from the client device that an identity of the user was authenticated by the second SSO service. In some examples, receiving the indication may include receiving a security assertion (e.g., SAML statement) from the client device that indicates the identity of the user. Additionally, or alternatively, the security assertion may be sent by reference to the first SSO service from the second SSO service and/or the client device. In such instances, the first SSO service may obtain the security assertion (e.g., SAML statement) from the second SSO service based at least in part on receiving the indication.

In some examples, the indication and/or the security assertion may contain additional data that is used by the first SSO service to determine how to dispose of a traffic flow between the client device and the service provider. For instance, additional detail may include an identity of the service provider; a posture of the client device (e.g., whether the device is properly maintained), user (e.g., whether the enterprise user is a regular or partner employee), and/or network (e.g., whether flows are sent over private SD-WAN or open Internet networks); and/or a threat matrix of client and cloud applications (e.g., whether the applications have previously been hacked into), users (e.g., whether the user is a suspect user), and/or enterprises (e.g., whether there is a known attack presently ongoing).

At 310, the method 300 includes determining, based at least in part on the identity of the user, whether the client device is to (i) access the service provider using an unsecured connection or (ii) access the service provider using a secured connection. As used herein, accessing the service provider using an unsecured connection may include accessing the service provider directly over the internet via a web browser running on the client device. Additionally, accessing the service provider using the secured connection may comprise accessing the service provider using a VPN connection, an SD-WAN connection, via a security cloud, a combination thereof, or another secured and/or encrypted connection. In some examples, determining whether the client device is to access the service provider using the secured connection or the unsecured connection may be further based at least in part on other attributes associated with the user and/or the service provider, such as: an identity of the service provider; a posture of the client device, user, and/or network; and/or a threat matrix of client and cloud applications, users, and/or enterprises.

If the first SSO service determines that the client device is to access the service provider using the unsecured connection, the first SSO service may generate third data including a security assertion (e.g., SAML statement) that is to be sent to the service provider to authenticate the identity of the user. The third data may also include an instruction that the client device access the service provider using the unsecured connection. The first SSO service may, in various examples, send the third data to the client device such that the client device may present the security assertion to the service provider when establishing a connection.

In contrast, if the first SSO service determines that the client device is to access the service provider using the secured connection, the first SSO service may generate fourth data that includes a first security assertion for the service provider and a second security assertion for an agent (e.g., web browser, VPN client, etc.) of the client device. The fourth data may also include an instruction that the client device access the service provider using the secured connection. The first SSO service may send the fourth data to the client device or the agent of the client device in order to facilitate establishment of the secured connection. The secured connection may comprise, for example, an encrypted traffic flow between at least one of the client or client agent and a cloud-based security service.

FIG. 4 illustrates a flow diagram of another example method 400 for using an authentication service to determine whether a client device may access an application using a connection that is secured or unsecured. At 402, the method 400 begins with receiving, at a first authentication service, first data including a first request to authenticate a user of a client device to access an application. The first authentication service may comprise a first SSO service, a first OpenID Connect service, and the like. Additionally, the application may comprise a cloud-based service provider, application service, etc. In various examples, the first request may comprise a first SAML request for a SAML statement identifying the user of the client device. The application may have redirected the client device to send the request to the first authentication service for authentication before granting the client device access to the application's service. The first authentication service may comprise a first SSO service, such as a first IdP service or a first OpenID Connect service that is, among other things, configured to determine whether traffic flows between client devices and cloud-based applications are to be established using secured connections (e.g., VPN, SD-WAN, security cloud, etc.) or unsecured connections (e.g., direct to the application via the internet).

At 404, the method 400 includes sending, to at least one of the client device or a second authentication service, second data representing a second request configured to prompt the second authentication service to authenticate the user of the client device. The second request may comprise a second SAML request for a security assertion (e.g., SAML statement) identifying the user of the client device. In some examples, the first authentication service may send the second data directly to the second authentication service. Additionally, or alternatively, the first authentication service may send the second data to the client device and direct the client device to obtain a SAML statement from the second authentication service. The second authentication service may comprise a second SSO service, such as a second IdP service or a second OpenID Connect service. The second authentication service may be configured to at least one of authenticate or authorize users of various client devices.

At 406, the method 400 includes receiving an indication that the user was authenticated by the second authentication service. In some examples, receiving the indication may include receiving a security assertion (e.g., SAML statement) from the client device that indicates the identity of the user. Additionally, or alternatively, the security assertion may be sent by reference to the first authentication service from the second authentication service and/or the client device. In such instances, the first authentication service may obtain the security assertion (e.g., SAML statement) from the second authentication service based at least in part on receiving the indication.

At 408, the method 400 includes determining, based at least in part on an attribute associated with at least one of the client device or the application, whether the client device is to (i) access the application using an unsecured connection or (ii) access the application using a secured connection. In some examples, the attributes associated with the client device and/or the application may include: an identity of the application; a posture of the client device, user, and/or network; and/or a threat matrix of client and cloud applications, users, and/or enterprises.

If the first authentication service determines that the client device is to access the application using the unsecured connection, the first authentication service may generate third data including a security assertion (e.g., SAML statement) that is to be sent to the application to authenticate the identity of the user. The third data may also include an instruction that the client device access the application using the unsecured connection. The first authentication service may, in various examples, send the third data to the client device such that the client device may present the security assertion to the application when establishing a connection.

In contrast, if the first authentication service determines that the client device is to access the application using the secured connection, the first authentication service may generate fourth data that includes a first security assertion for the application and a second security assertion for an agent (e.g., web browser, VPN client, etc.) of the client device. The fourth data may also include an instruction that the client device access the application using the secured connection. The first authentication service may send the fourth data to the client device or the agent of the client device in order to facilitate establishment of the secured connection. The secured connection may comprise, for example, an encrypted traffic flow between at least one of the client or client agent and a cloud-based security service.

Figure 5:
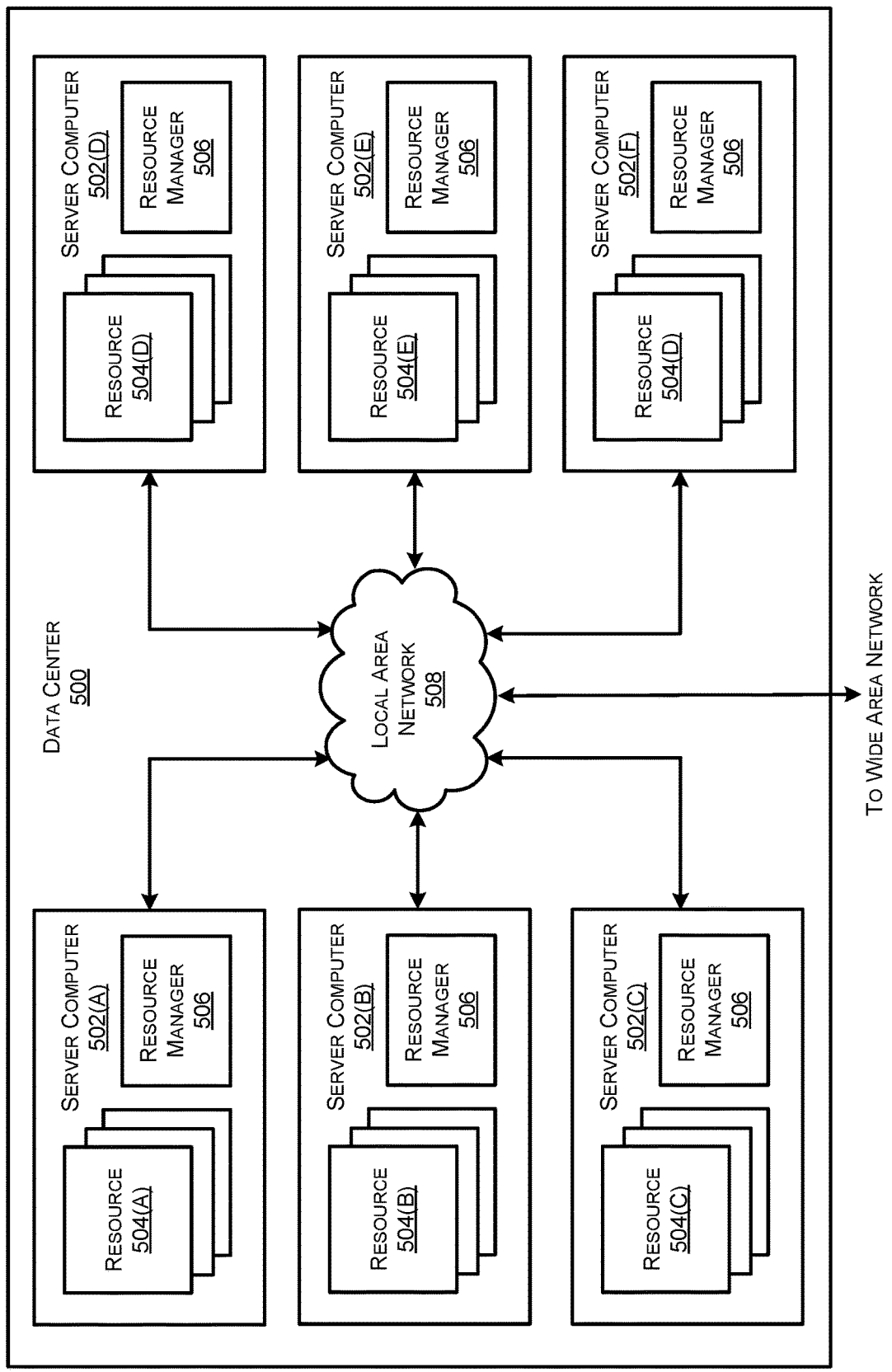
FIG. 5 illustrates a computing system diagram of an example configuration for a data center that can be utilized to implement aspects of the technologies disclosed herein.

FIG. 5 illustrates a computing system diagram of an example configuration for a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, the any type of computing device described herein. Although described as servers, the server computers 502 may comprise any type of networked device, such as servers, switches, routers, hubs, bridges, gateways, modems, repeaters, access points, etc.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, VPNs, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some instances, the data center 500 may provide computing resources, like applications, VM instances, VPN instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like tenant containers and VM instances, data storage resources, networking resources, data communication resources, network services, VPN instances, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
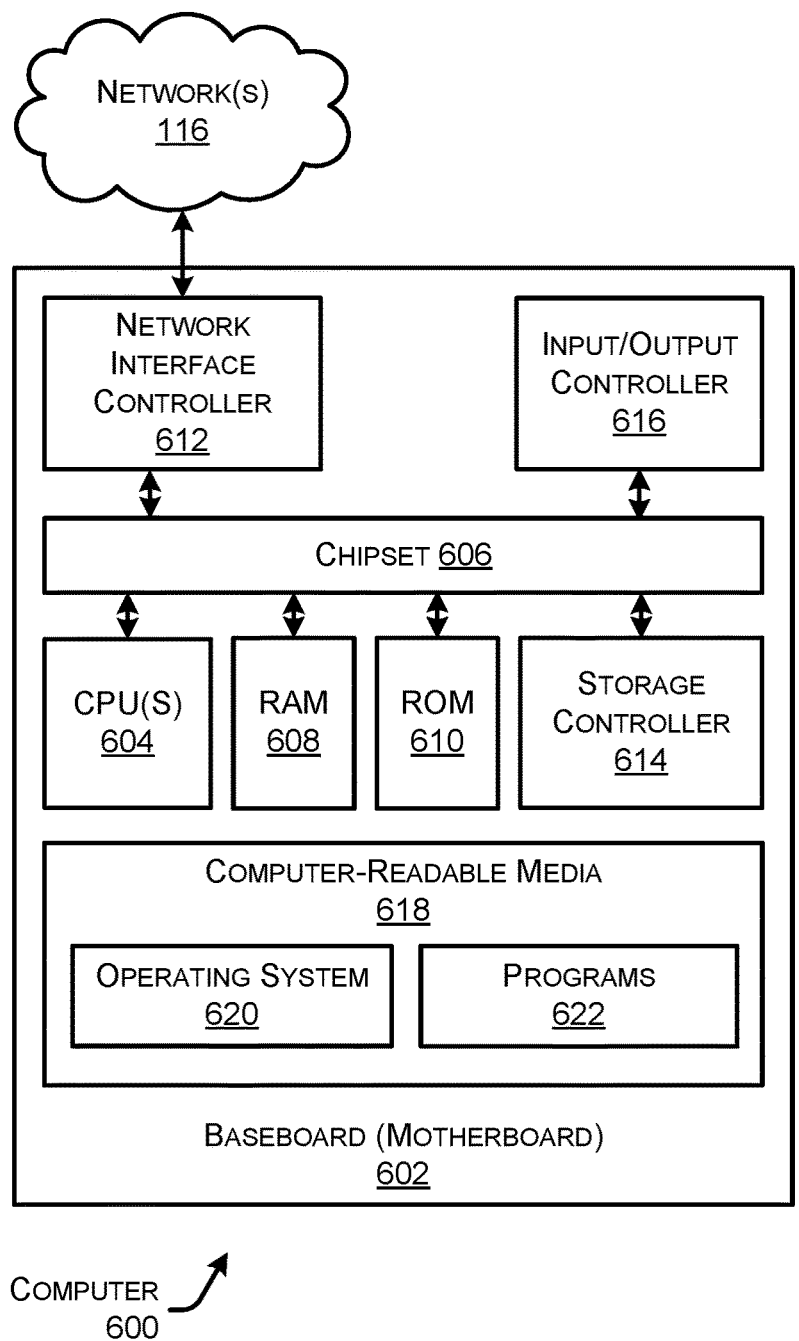
FIG. 6 illustrates a computer architecture diagram showing an example computer hardware architecture for implementing a network device that can be utilized to implement aspects of the various technologies presented herein.

FIG. 6 illustrates a computer architecture diagram showing an example computer hardware architecture for implementing a network device that can be utilized to implement aspects of the various technologies presented herein. The computer architecture shown in FIG. 6 illustrates a conventional server computer, workstation, desktop computer, laptop, tablet, network appliance, e-reader, smartphone, or other computing device, and can be utilized to execute any of the software components presented herein. The computer 600 may, in some examples, correspond to an SSO service 102 described herein, and may comprise networked devices such as servers, switches, routers, hubs, bridges, gateways, modems, repeaters, access points, etc.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the networks 116. The chipset 606 can include functionality for providing network connectivity through a NIC 612, such as a gigabit Ethernet adapter. The NIC 612 is capable of connecting the computer 600 to other computing devices over the networks 116. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the various components in the environment 100 may be supported by one or more devices similar to computer 600. Stated otherwise, some or all of the operations performed by the various components in the environment 100 may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1A-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of an SSO service 102, client device 104, or service provider 106. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the SSO service 102 and client device 104. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for determining connectivity in multi-hop paths using BFD Echo packet(s). The programs 622 may enable the client device 104 to perform various operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, at a first single sign-on (SSO) service and from a client device, first data including a first request to authenticate a user of the client device to access a service provider;
generating, at the first SSO service, second data representing a second request configured to prompt a second SSO service to authenticate the user of the client device;
sending the second data to the client device;
receiving an indication from the client device that an identity of the user was authenticated by the second SSO service;
determining, at the first SSO service and based at least in part on the identity of the user and a service of the service provider which the user is attempting to access, whether:
(i) a communication flow from the client device is allowed to access the service of the service provider using an unsecured connection; or
(ii) the communication flow from the client device is to be routed through a security service before being provided access to the service of the service provider to result in a secured connection;
in response to determining that the communication flow is allowed to access the service using the unsecured connection, routing the communication flow to the service; and
in response to determining that the communication flow is to be routed through the security service before being provided access to the service to result in the secured connection, routing the communication flow to the security service.

2. The method of claim 1, further comprising:
determining that the client device is to access the service provider using the unsecured connection;
generating, at the first SSO service, third data including (i) a security assertion for the service provider, the security assertion indicating the identity of the user, and (ii) an instruction that the client device accessed the service provider using the unsecured connection; and
sending the third data to the client device.

3. The method of claim 1, further comprising:
determining that the client device is to access the service provider using the secured connection;
generating, at the first SSO service, third data including (i) a first security assertion for the service provider, (ii) a second security assertion for an agent of the client device, and (iii) an instruction that the client device accessed the service provider using the secured connection.

4. The method of claim 1, wherein determining whether the client device is to (i) access the service provider using the unsecured connection or (ii) access the service provider using the secured connection is further based at least in part on at least one of an identity of the service provider, a posture of the client device, or a device type associated with the client device.

5. The method of claim 1, wherein receiving the indication comprises receiving a security assertion from the client device that indicates the identity of the user.

6. The method of claim 1, further comprising obtaining a security assertion from the second SSO service based at least in part on receiving the indication, the security assertion indicating the identity of the user.

7. The method of claim 1, wherein the first SSO service comprises a first identity provider (IdP) service that is configured to determine whether traffic flows between client devices and service providers are to be established using secured connections or unsecured connections, and wherein the second SSO service comprises a second IdP service that is configured to at least one of authenticate or authorize users of the client devices.

8. A system comprising:
one or more processors; and
one or more non-transitory computer-readable media storing instructions that, when executed by the one or more processors, cause the one or more processors to perform operations comprising:
receiving, at a first single sign-on (SSO) service and from a client device, first data including a first request to authenticate a user of the client device to access a service provider;
generating, at the first SSO service, second data representing a second request configured to prompt a second SSO service to authenticate the user of the client device;
sending the second data to the client device;

receiving an indication from the client device that an identity of the user was authenticated by the second SSO service;

determining, at the first SSO service and based at least in part on the identity of the user and a service of the service provider which the user is attempting to access, whether:

(i) a communication flow from the client device is allowed to access the service of the service provider using an unsecured connection; or (ii) the communication flow from the client device is to be routed through a security service before being provided access to the service of the service provider to result in a secured connection;

in response to determining that the communication flow is allowed to access the service using the unsecured connection, routing the communication flow to the service; and in response to determining that the communication flow is to be routed through the security service before being provided access to the service to result in the secured connection, routing the communication flow to the security service.

9. The system of claim 8, the operations further comprising:

determining that the client device is to access the service provider using the unsecured connection;

generating, at the first SSO service, third data including (i) a security assertion for the service provider, the security assertion indicating the identity of the user, and (ii) an instruction that the client device accessed the service provider using the unsecured connection; and sending the third data to the client device.

10. The system of claim 8, the operations further comprising:

determining that the client device is to access the service provider using the secured connection;

generating, at the first SSO service, third data including (i) a first security assertion for the service provider, (ii) a second security assertion for an agent of the client device, and (iii) an instruction that the client device accessed the service provider using the secured connection.

11. The system of claim 8, wherein determining whether the client device is to (i) access the service provider using the unsecured connection or (ii) access the service provider using the secured connection is further based at least in part on at least one of an identity of the service provider, a posture of the client device, or a device type associated with the client device.

12. The system of claim 8, wherein receiving the indication comprises receiving a security assertion from the client device that indicates the identity of the user.

13. The system of claim 8, the operations further comprising obtaining a security assertion from the second SSO service based at least in part on receiving the indication, the security assertion indicating the identity of the user.

14. The system of claim 8, wherein the first SSO service comprises a first identity provider (IdP) service that is configured to determine whether traffic flows between client devices and service providers are to be established using secured connections or unsecured connections, and wherein the second SSO service comprises a second IdP service that is configured to at least one of authenticate or authorize users of the client devices.

15. A system comprising:

one or more processors; and one or more non-transitory computer-readable media storing instructions that, when executed by the one or more processors, cause the one or more processors to perform operations comprising:

receiving, at a first single sign-on authentication service, first data including a first request to authenticate a user of a client device to access an application of a service provider;

sending, to at least one of the client device or a second authentication service, second data representing a second request configured to prompt the second authentication service to authenticate the user of the client device;

receiving an indication that the user was authenticated by the second authentication service; and determining, at the first single sign-on authentication service and based at least in part on an attribute associated with the client device and the application of the service provider which the user is attempting to access, whether: (i) a communication flow from the client device is allowed to access the application of the service provider using an unsecured connection; or (ii) the communication flow from the client device is to be routed through a security service before being provided access to the application of the service provider to result in a secured connection; in response to determining that the communication flow is allowed to access the application using the unsecured connection, routing the communication flow to the application; and in response to determining that the communication flow is to be routed through the security service before being provided access to the application to result in the secured connection, routing the communication flow to the security service.

16. The system of claim 15, the operations further comprising:

determining that the client device is to access the application using the unsecured connection;

generating, at the first authentication service, third data including (i) a security assertion for the application, the security assertion indicating an identity of the user, and (ii) an instruction that the client device access the application using the unsecured connection; and sending the third data to the client device.

17. The system of claim 15, the operations further comprising:

determining that the client device is to access the application using the secured connection;

generating, at the first authentication service, third data including (i) a first security assertion for the application, (ii) a second security assertion for an agent of the client device, and (iii) an instruction that the client device access the application using the secured connection.

18. The system of claim 15, wherein the attribute comprises at least one of an identity of the application, an identity of the user, a posture of the client device, or a device type associated with the client device.

19. The system of claim 15, wherein receiving the indication comprises receiving a security assertion from the client device that indicates an identity of the user.

20. The system of claim 15, wherein the first authentication service comprises a first OpenID Connect (OIDC) service that is configured to determine whether traffic flows between client devices and service providers are to be established using secured connections or unsecured connections, and wherein the second authentication service comprises a second OIDC service that is configured to at least one of authenticate or authorize users of the client devices.

* * * * *